June 16, 1931.  E. H. NORINDER  1,810,083

HIGH VACUUM MOLECULAR PUMP

Filed Nov. 24, 1928

INVENTOR

*Ernst H. Norinder.*

BY *O. S. Schairer*

ATTORNEY

Patented June 16, 1931

1,810,083

UNITED STATES PATENT OFFICE

ERNST HARALD NORINDER, OF UPPSALA, SWEDEN

HIGH VACUUM MOLECULAR PUMP

Application filed November 24, 1928, Serial No. 321,586, and in Sweden November 30, 1927.

This invention relates to improvements in vacuum pumps of the type known as molecular pumps for producing very high vacuum. Such a pump consists of a rotor mounted within a stator that is provided with a helical inner-surface groove of gradually decreasing cross sectional area.

Also the pumps, as hitherto constructed, have been provided with cylindrical rotors and stators or with conical rotors and stators. It is difficult, where cylindrical rotors and stators are used, to obtain suitably small clearances between the rotors and the stators. Pumps having conical rotors and stators, as hitherto constructed, have been provided with two bearings, one on the high-vacuum side of the pump and one on the low-vacuum side. This construction renders it difficult to obtain a suitable adjustment of the rotor within the stator and to avoid leakage and evaporation of oil from the bearing on the high-vacuum side.

The purpose of this invention is to eliminate the above-mentioned difficulties. Accordingly, the rotor is made of substantially frusto-conical form, the interior surface of the stator being of similar form. A helical groove is provided in one of the adjacent surfaces of the rotor and stator with a gradually decreasing cross-section area of the groove from the high-vacuum side to the low-vacuum side. The rotor is supported at only one position in a separate bearing that may be suitably placed within the vacuum space of the pump. The rotor is adjustable relative to the stator. The rotor support is also adjustable for regulating the clearance between the rotor and the stator. The rotor support is placed on the low-vacuum side of the support is placed on the low-vacuum side of the pump to preclude leakage from the low-vacuum side to the high-vacuum side thereof. By this construction, the evaporation of oil, from the rotor bearings, to the high-vacuum side of the pump is precluded.

Figure 1:
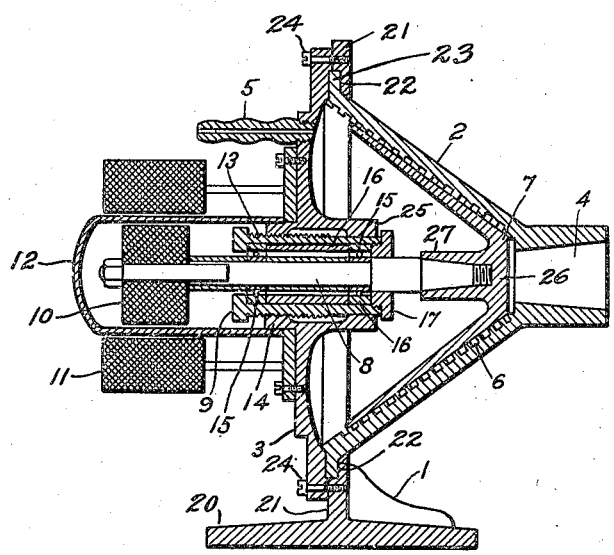
Figure 2:
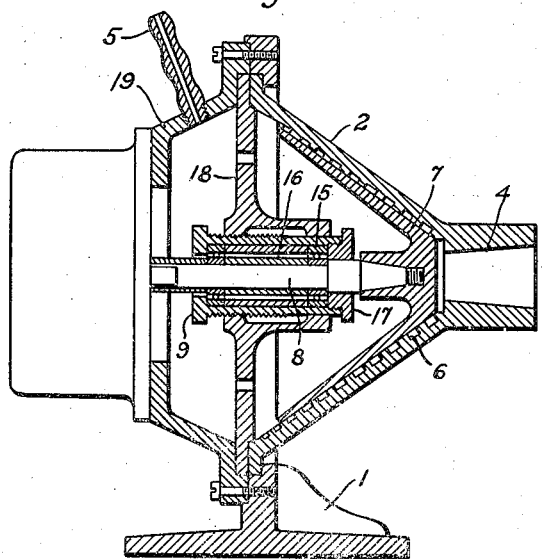

Fig. 1 of the accompanying drawings is a view, in transverse section, of a pump constructed in accordance with my invention, and Fig. 2 is a similar view of a modified form thereof.

In Fig. 1, a support 1 is provided for a substantially frusto-conical stator 2. A cover 3 is provided for the stator. The stator is provided, at one end, with a high-vacuum inlet portion 4 and, at its other end, with the cover 3 which is provided with a low-vacuum outlet member 5. The inner substantially frusto-conical surface of the stator is provided with a helical groove, the cross-sectional area of which decreases from the high-vacuum side to the low-vacuum side. This result may be obtained by having the groove of uniform width and varying depth, of varying width and uniform depth or by a combination of varying width and depth.

A substantially frusto-conical rotor 7, having a smooth outer surface closely conforming to the inner surface of the stator 2, is supported by a shaft 8 that is mounted in the cover 3 by an adjustable bearing structure 9. The free end of the shaft 8 is provided with an armature 10, that is enclosed by an airtight cover 12, preferably of nonmagnetic material, that is mounted on the cover 3. In another form, a suitable airtight bearing is located near the free end of the shaft 8 which extends through the cover 3.

The bearing support for the shaft 8 comprises a cylinder 13, that is screw-threadably mounted in a ring 14, that is fixed in the cover 3. The cylinder 13 supports ball bearings 15 which are separated by a distance ring 16 and fixed by a nut 17. The rotor 7 may be adjusted relative to the stator 2 by turning the ring 13. The bearing support of the rotor is fixed on the low-vacuum side of the pump by which leakage to the high-vacuum side is avoided.

The air molecules in the spiral groove 6 of the stator 2 are, by the rotation of the rotor 7, thrown towards the regions in the pump where the distance between the bottom of the groove and the rotor is the shortest, that is, toward the low-vacuum side, from which side the air is sucked, through the outlet 5, by a low-vacuum pump.

The support 1 is preferably formed as a single member of inverted substantially T- shape in vertical central section, as viewed in Fig. 1, having the lower end 20, or cross-head of the inverted T, constituting a floor-resting base and the central vertical leg 21 constituting a ring in a plane perpendicular thereto having a rabbet groove 22 at one side of its inner perimeter.

The stator member 2 is preferably of one piece having an outwardly-extending annular flange 23, at its major base end, fitting the groove 22, the remainder of the member 2 being at the side of the ring 21 opposite the groove 22 and having its portion 4 of hollow cylindrical form projecting from its minor-base end.

The stator cover 3 constitutes a transverse wall member closing the major base end of the stator 2 and is secured to the ring 21, as by screws 24, to hold the flange 22 and, thereby, the stator 2, in position. The wall member 3 is formed with an apertured central bearing portion 25 of cylindrical shape and an opening for the reception of the outlet member 5.

The rotor 7, preferably of one piece, is provided with a closed minor-base end 26 and a sleeve 27 projecting inwardly, or to the left as viewed in Fig. 1, from the closed end 26.

The shaft 8 is secured, at one end, in the sleeve 27 and projects, from the sleeve, through and beyond the bearing portion 25 to a position where it supports the armature 10 and is enclosed by the cover 12.

The form of my invention shown in Fig. 2 differs from the form shown in Fig. 1 only in the construction of the adjustable bearing structure 9 of the shaft 8 which is supported in a special frame 18 that is fixed to the stator 2. The stator is provided with a special cover 19, by which the bearing structure is wholly placed within the vacuum chamber.

While I have shown and described particular forms of my invention, changes may be effected therein without departing from the spirit and scope thereof, as set forth in the appended claims.

I claim as my invention:

1. A vacuum pump of the molecular type comprising a support having floor-resting base and a ring portion disposed in a plane perpendicular thereto, said ring having a substantially rabbet groove at one side of its inner perimeter, a one-piece hollow substantially frusto-conical stator member having an outwardly-extending annular flange at its major-base end fitting said groove, the remainder of said member being at the side of said ring opposite said groove and including a hollow cylindrical inlet-port portion projecting from its minor-base end, a transverse wall member closing said major-base end and secured to said ring to hold said first member in position, said wall member having a central bearing opening and an outlet opening, a one-piece hollow substantially frusto-conical rotor member fitting said stator, said rotor having a closed minor-base end and a sleeve projecting inwardly therefrom, one of said frusto-conical members having a helical groove in a surface adjacent to the other of decreasing cross-sectional area from adjacent to its minor toward its major-base end, a shaft secured at one end in said sleeve and projecting through and beyond said central bearing opening, means supported by said wall member in its central opening for journalling and longitudinally adjusting said shaft, a rotatable electric motor armature at the other end of said shaft, a stator for the armature mounted on said support and an end-bell cover for sealing the armature from the atmosphere.

2. A vacuum pump of the molecular type comprising a support having floor-resting base and a ring portion disposed in a plane perpendicular thereto, said ring having a substantially rabbet groove at one side of its inner perimeter, a one-piece hollow substantially frusto-conical stator member having an outwardly-extending annular flange at its major-base end fitting said groove, the remainder of said member being at the side of said ring opposite said groove and including a hollow cylindrical inlet-port portion projecting from its minor-base end, a transverse wall member closing said major-base end and secured to said ring to hold said first member in position, said wall member having a central bearing opening and an outlet opening, a one-piece hollow substantially frusto-conical rotor member fitting said stator, said rotor having a closed minor-base end and a sleeve projecting inwardly therefrom, one of said frusto-conical members having a helical groove in a surface adjacent to the other of decreasing cross-sectional area from adjacent to its minor toward its major-base end, a shaft secured at one end in said sleeve and projecting through and beyond said central bearing opening, means supported by said wall member in its central opening for journalling and longitudinally adjusting said shaft, a rotatable electric motor armature at the other end of said shaft, a nonmagnetic end-bell cover enclosing said armature and supported in sealed relation to said wall and a stator for the armature surrounding said end-bell cover and mounted on said support.

In testimony whereof he affixes his signature.

ERNST HARALD NORINDER.